Dec. 14, 1965    SHIGENARI SODA ET AL    3,223,027
PROCESSING METHOD AND DEVICE OF SYNTHETIC RESIN SHEET
Filed Jan. 29, 1962    8 Sheets-Sheet 1

INVENTORS
SHIGENARI SODA
KENKICHI MURAKAMI
BY JUNICHI NAKAJIMA

McHew + Toren
ATTORNEYS

INVENTORS
SHIGENARI SODA
KENKICHI MURAKAMI
JUNICHI NAKAJIMA
BY Matthew & Toren
ATTORNEYS

INVENTORS
SHIGENARI SODA
KENKICHI MURAKAMI
JUNICHI NAKAJIMA
BY
ATTORNEYS

Dec. 14, 1965    SHIGENARI SODA ET AL    3,223,027
PROCESSING METHOD AND DEVICE OF SYNTHETIC RESIN SHEET
Filed Jan. 29, 1962    8 Sheets-Sheet 8

INVENTORS.
SHIGENARI SODA
KENKICHI MURAKAMI
BY JUNICHI NAKAJIMA

McGlew & Toren
ATTORNEYS

United States Patent Office 3,223,027
Patented Dec. 14, 1965

3,223,027
PROCESSING METHOD AND DEVICE OF
SYNTHETIC RESIN SHEET
Shigenari Soda, Oryo-cho, Nara, and Kenkichi Murakami
and Junichi Nakashima, Jyotoku, Osaka, Japan, assignors to Sekisui Kagaku Kogyo Kabushiki Kaisha, Osaka,
Japan
Filed Jan. 29, 1962, Ser. No. 169,547
Claims priority, application Japan, Jan. 28, 1961,
36/2,581
5 Claims. (Cl. 100—93)

The present invention relates to an apparatus for continuous processing of synthetic resin sheets.

In the conventional process for calendering of thermoplastic resin, it is difficult to manufacture a beautiful and lustrous film or sheet, and especially it is impossible to make a beautiful and lustrous thick sheet. Consequently, in calendering or laminating of such a film or sheet, a hydraulic (or oil pressure) multi-stage press has been commonly used.

However, this conventional press work, which is carried out as a series of such operations as loading, heating, pressing, cooling and unloading the film or sheet, has various disadvantages such as great heat and time losses caused by repetition of heating and cooling the film or sheet, requiring much labour in loading and unloading of the work, not to mention the impossibility of manufacturing a long beautiful and lustrous film sheet, so that this press type operation is unsuitable for mass production of good, satisfactory films or sheets.

In addition, there is another conventional method, which is the so called Roto Cure method, where a film or sheet is passed between rolls and belts and heated and pressed by tension of the belts surrounding the rolls, and then calendered or laminated as the case may require. But when the tensioned belts are pressed and driven, the belts will inevitably meander and a continuous operation becomes difficult, and it is possible neither to attain complete de-foaming by such a slight pressure as that provided by the tension of the belts nor to get rid of strains brought about by the repetition of high temperature heating and cooling. In addition, the manufactured film or sheet does not have a uniform thickness, but has a circular arc strain because of the film or sheet being pressed along the circular arc surface of the roll. Furthermore suitable cooling cannot be achieved.

It has been suggested recently that such processing be effected by means of two endless metal belts arranged to extend between cooperating rollers, arranged in pairs, which press the adjacent runs of the two belts toward each other. The synthetic resin film or sheet is passed between these adjacent runs and, during such passage, is first heated and pressed on both sides to be melted and deformed, and is then hardened or set by being cooled and pressed before passing out from between the two belts. However, during this processing, the pressure is applied to the film or sheet intermittently by virtue of the spacing of the pressure rollers along the metal belts, so that the completed sheet will have strains and will not have a uniform thickness. Furthermore, even if complete expulsion of air bubbles and the like can be attained during the heating of the film or sheet, synthetic resin melting and sticking to the steel belts will peel off before being cooled sufficiently because of the slight strain on the steel belts, thus causing air cells to form within the film or sheet and also causing a lack of lustre.

Further when the two endless steel belts are given tension, pressed and driven by the rolls, the belts will inevitably meander, making a continuous operation difficult. Because of these various disadvantages, it has been regarded as next to impossible to manufacture continuously a synthetic resin film or sheet that has a beautiful and lustrous surface.

One of the objects of the present invention, which eliminates the defects mentioned above, is to provide a device to manufacture a synthetic resin sheet or board that has a beautiful surface.

Another object of the present invention is to obtain a synthetic resin sheet or board that has a beautiful cast surface.

Also it is an object of the present invention to provide a device to stick together a plurality of the thermoplastic sheets or boards without leaving air bubbles between the sheets or the boards.

As mentioned above, it is likewise an object of the present invention to stick together a plurality of thermal plastic sheets or boards that have cast surfaces faithful to the moulding surfaces.

In accordance with the present invention, the films or sheets are processed by passing between adjacent runs of a pair of inlet metal belts of steel or equivalent material which effect a pressing or compressing of the sheets or films. Adjacent runs of the two belts face each other to finish the surface of the synthetic resin film or sheet. On the inner sides of the facing run of the two steel belts, there are arranged slat-type conveyors which press the belt runs toward each other from opposite sides, as well as drive the belts, and simultaneously compress the synthetic resin film or sheet interposed between the facing run of the belts. During such passage, the synthetic resin films or sheets are heated during earlier part of the passage between the belts and cooled in a later portion of the travel through the belt. By the provision of the slat-type conveyors, the surfaces of the steel belts are given a uniform and continuous support and pressure toward each other to exert a uniform and continuous planar pressure on the surfaces of the synthetic resin, films, sheet or board to provide a high quality finish to the surface thereof.

These and other objects of the present invention will be apparent to those skilled in the art after a consideration of the following detailed description of the preferred construction, taken in conjunction with the accompanying drawings illustrating such construction.

In the drawings:

FIG. 15 is a partial longitudinal sectional view of a modified form of slat-type conveyor; and FIG. 16 is a side elevation view of still a further embodiment of the invention.

For a detailed description of the present invention, reference will now be made to the accompanying drawings, wherein endless steel belts 1, 1' that will dress the surface of a film or sheet extends under tension between two pairs of idler rollers 2, 2 and 2', 2', respectively, with the outer surfaces of their inner runs facing each other. Within the belts 1, 1' there are arranged opposing pressing and heating means and pressing and cooling means.

Figure 2:
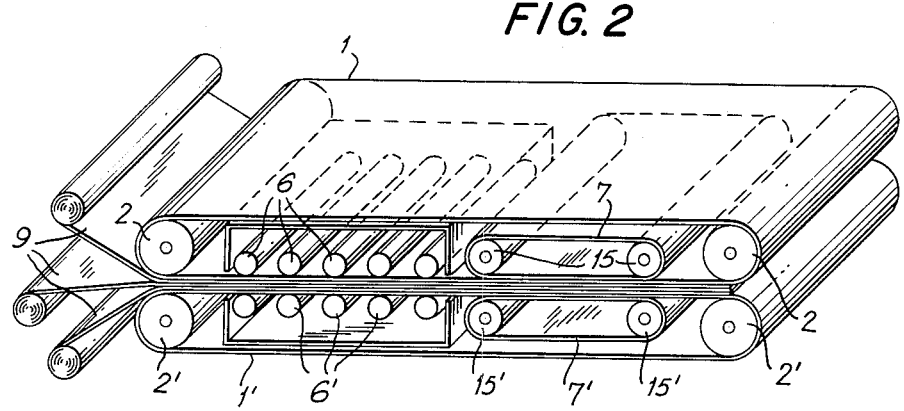
FIG. 2 is a somewhat schematic oblique view illustrating another embodiment of the invention.
Figure 3:
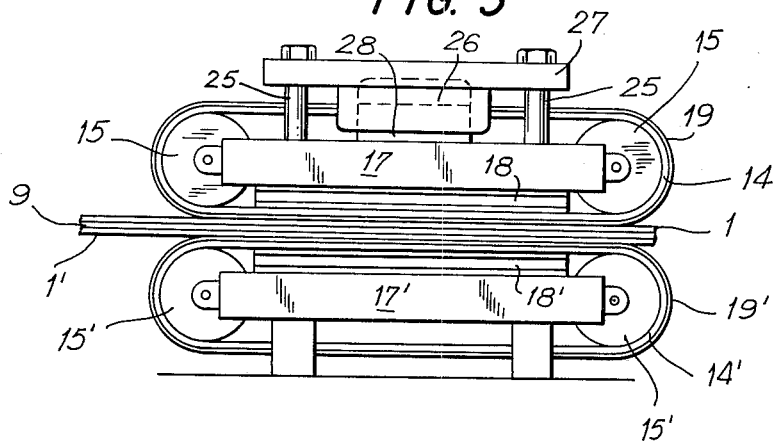
FIG. 3 is a side elevation view of a pair of slat-type conveyors pressing, from opposite sides, steel belts which sandwich therebetween a synthetic resin sheet.
Figure 4:
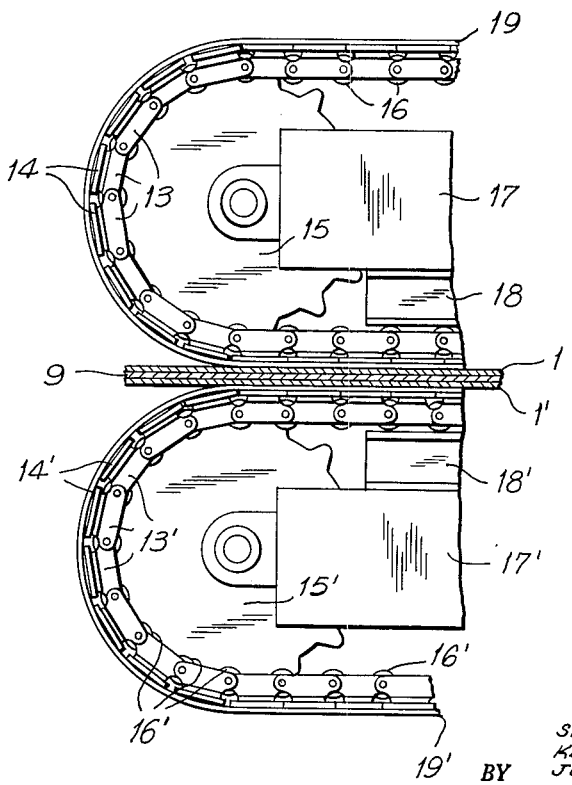
FIG. 4 is an enlarged partial side elevation view corresponding to FIG. 3.
Figure 5:
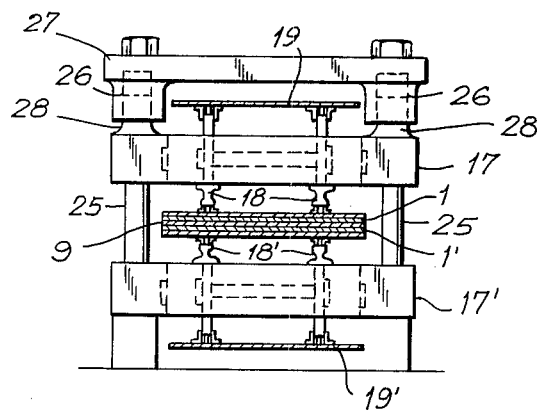
FIGS. 5 and 6 are transverse vertical sectional views of FIGS. 3 and 4, respectively.
Figure 6:
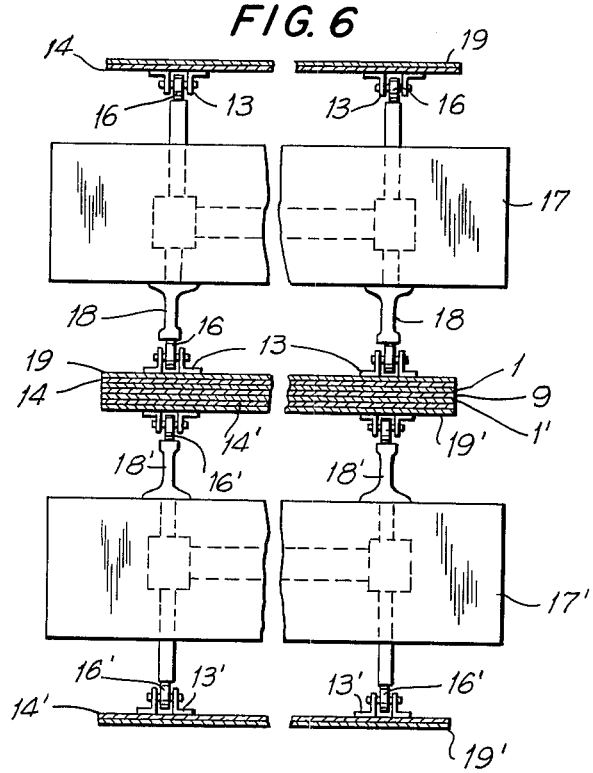

The pressing and heating means comprises slat conveyors 4, 4' that extend in opposed relation between two pairs of sprocket wheels 5, 5 and 5', 5', respectively, in heating boxes or ovens 3, 3', Alternatively, and as shown in FIG. 2, the heating boxes or ovens, which are oppositely disposed and facing each other, may have arranged therein plural pairs of pressing and heating rollers 6, 6 and 6', 6', respectively. In the pressing and cooling section, slat conveyors 7 and 7' are disposed between pairs of rollers 15, 15 and 15', 15', respectively.

The above-mentioned mechanisms are operated as follows: The steel belts 1, 1' that are sandwiched between slat conveyors 7, 7' will be driven by rotation of these slat conveyors to move a synthetic resin film sheet or board 9 which is engaged between belts 1, 1'.

The resin film sheet or board 9 thus engaged between the steel belts 1, 1' is led between heating boxes 3, 3' and, through the medium of the steel belts on the both sides thereof, it is pressed and heated by slat conveyors 4, 4', so that resin is completely melted and de-formed. Closely sticking to the steel belts, the film or sheet is led between cooling slat conveyors 7, 7', whereby it is pressed and cooled at the same time.

As above described, in the present invention a synthetic resin film, sheet or board is engaged between endless steel belts, on the rear sides of the facing runs of which are arranged slat conveyors which drive the steel belts and press the facing steel belts toward each other at the same time. Thus the present invention has the advantage that steel belts are pressed firmly against the synthetic resin film, sheet, or board by slat conveyors which act to drive the steel belts while simultaneously pressing these belts against the sheet or board. This is a distinctly advantageous procedure as compared to conventional methods wherein a steel belt is directly driven and the moving force results in meandering of the belts.

In order to explain detailed examples of the slat conveyor, reference will now be made to the accompanying drawings, wherein the slat conveyor shown in FIGS. 3 through 6 comprises iron plated slats 14, 14' attached to roller chains 13, 13', while said roller chains 13, 13' engage sprocket wheels 15, 15', and rollers 16, 16' between the links of roller chains 13, 13' are guided by rails 18, 18' arranged on the frame 17, 17'.

Either one of the upper and the lower frames of the slat conveyor is capable of vertical displacement and pressing by oil pressures.

As shown in FIGS. 3, 4, 5, 7, 8, 12 and 14, cushioning materials 19, 19', such as heat-proof rubber belts, are arranged on the exterior of the slat conveyor, and the steel belts 1, 1' that sandwich the synthetic resin board are led between the cushioning materials to press and cool, simultaneously, the synthetic resin board after heating.

The cushioning materials of this slat conveyor serve to protect the manufactured resin sheets or boards from the unfavourable effects brought about by a difference in levels on account of slight crevices in front or in the rear of the slats, to prevent the steel belt from being damaged and, as their great advantage, to reduce the necessary pressure for defoaming to the minimum by the cushioning effect.

It is necessary to use a slat conveyor in order to provide a uniform pressure over a fairly large dimension in the advancing direction as well as the sideway direction and, in order for said slat conveyor to be used as an endless conveyor, it is essentially required to have a bending part in its advancing direction.

Consequently a great resistance to lateral movement can be provided. But it is difficult to effect a precisely coplanar or uniplanar movement in the advancing direction. Therefore, in order to mitigate the unfavourable effects caused by the uneven surface of a slat conveyor resultant from an inevitable crevice or a difference in levels arising between the connecting parts of the adjacent units of the slat conveyor, an elastic material is interposed between the slats of the slat conveyor and the steel belts, so that said unfavourable effect is diminished by said elastic sheet.

In the manufacturing device described at the very first, the unfavourable effects upon the surface of the resin sheet due to the uneven surface of a slat conveyor is mitigated by the interposed steel belt. By so using such elastic sheet, the effects of the uneven surface of the slat conveyor upon the surface of the resin sheet can be effectively neutralized.

The interposed elastic sheet may well be a hard elastic one that can be used to resist strongly the deflecting effect of the uneven surface of the slat-type conveyor, or it may be one quite soft enough to absorb all the effects of the uneven slat. Likewise, an elastic sheet of a medium softness can be used satisfactorily. In other words, the elastic sheet can be of any hardness for the above purpose, i.e., it may well be either of a material as hard as the steel belt or a flexible material.

When such a substance as natural rubber, synthetic rubber or synthetic resin that has an elastic deformation in the direction of its thickness is used as the elastic sheet interposed between the slat conveyor and the dressing steel belt, the bubbles remaining between the laminating synthetic resin sheets will not be expelled from both sides in the direction of the said thickness, but will be pressed gradually from the front in the advancing direction in a manner similar to squeezing a tube, so that the bubbles existing between the laminating resin sheets or boards or between the resin board and the steel belt can be expelled quite easily.

Figure 7:
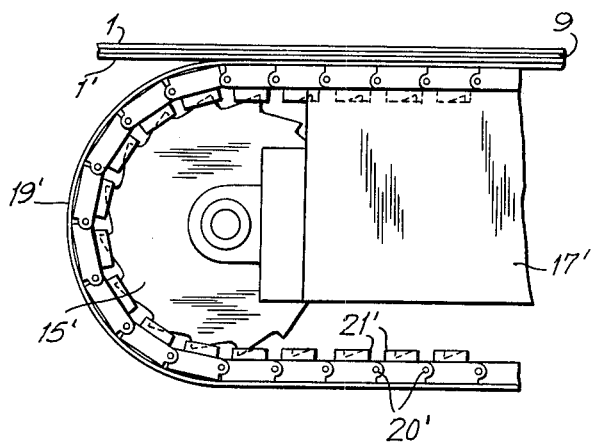
FIG. 7 is a partial side elevation view of a slat-type conveyor usable with the invention.
Figure 8:
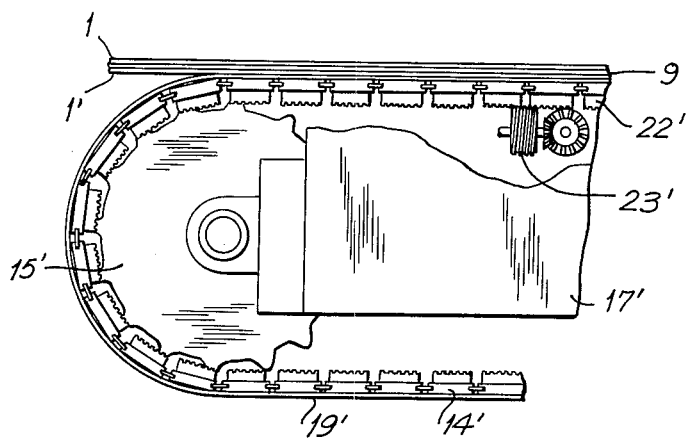
FIG. 8 is a partial side elevation view of a slat-type conveyor illustrating a modified form of driving means therefor.
Figure 9:
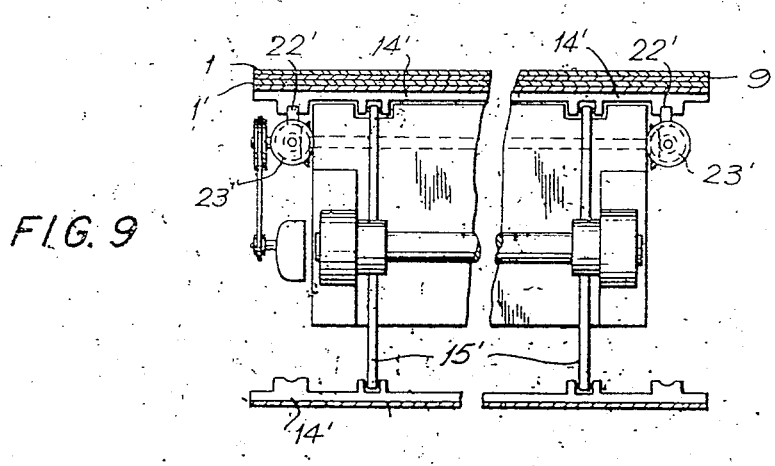
FIG. 9 is an end elevation view, partly in section, of the conveyor shown in FIG. 8.
Figure 10:
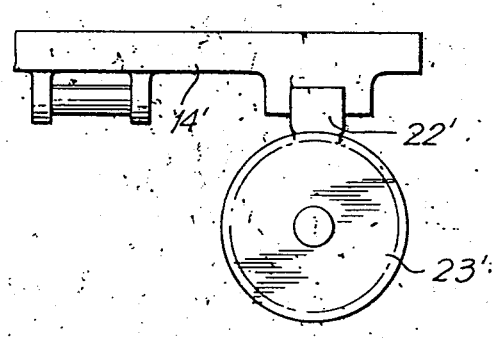
FIG. 10 is a partial end elevation view of the conveyor shown in FIGS. 8 and 9 illustrating the driving means to an enlarged scale.
Figure 11:
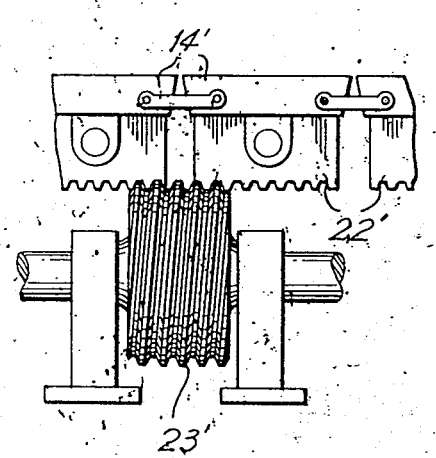
FIG. 11 is a side elevation view corresponding to FIG. 10.

The above-mentioned slat conveyor loads the roller chain with both the pulling force required for operating the slats of the slat conveyor and the support of the load of press. But there is a slat conveyor which loads the roller chain differently, dividing these two loads as follows:

The driving force required for operating the slat-type conveyors in FIGS. 7 through 11 is provided by means other than roller chains independent of the slat-type conveyors. In FIG. 7, slats are hingedly interconnected, as by hinge pins 20' inserted through apertured ears in the slats, and sprocket-engaging recesses 21' are formed directly in the slats to engage the sprocket wheels 15'.

In the embodiment of FIGS. 8 through 11, the movement of the slat-type conveyors is effected by screws 23' which are rotatable about axes extending parallel to the direction of movement of the runs of the conveyors but which are fixed against rotation. These screws 23' are mounted on frames 17, 17' and are engageable with "nuts" 22', respectively, each secured to a slat 14'. However, the slat-type conveyors are still trained around the sprockets 15 and 15'.

Figure 12:
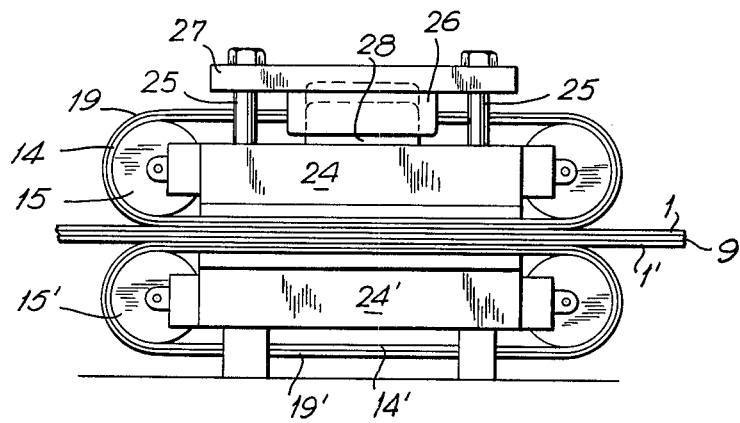
FIG. 12 is a side elevation view of another embodiment of the invention.
Figure 13:
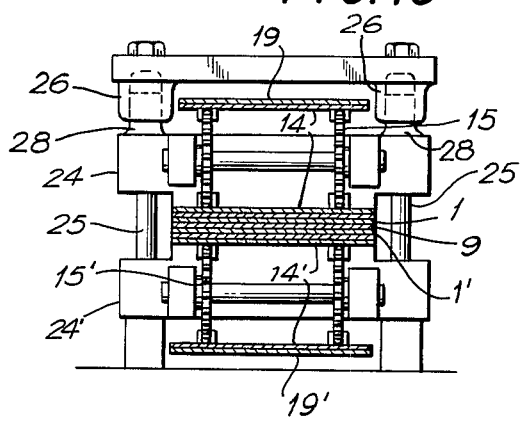
FIG. 13 is a transverse vertical sectional view through the apparatus shown in FIG. 12.
Figure 14:
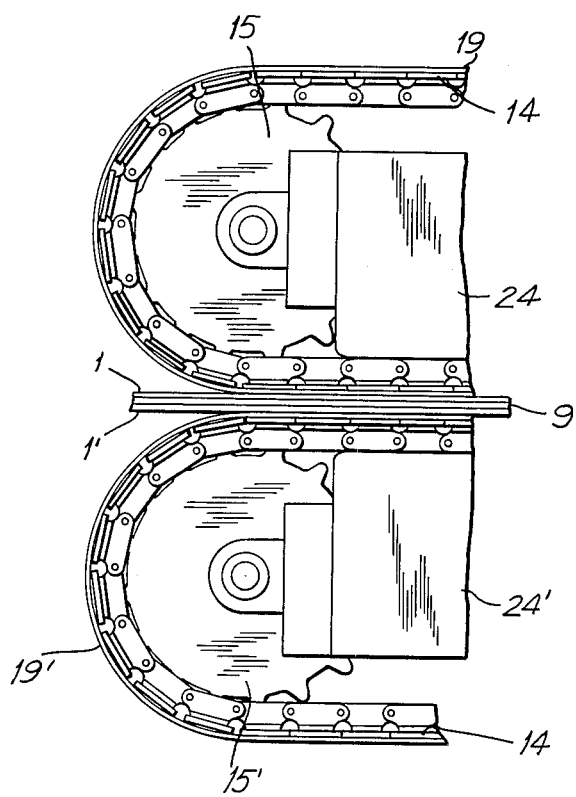
FIG. 14 is a partial side elevation view illustrating still another modified form of slat-type conveyor.

FIGS. 12, 13 and 14 show a modified arrangement for exerting pressure against the steel belts. In these figures, the slat-type conveyors are mounted directly on slides 24, 24' whose temperature is controlled to perform heating, in the one case, or cooling, in the other case. These slides are bodily movable toward and away from each other.

In all the cases explained as above, endless cushioning materials are used on the slat conveyors. But the cushioning materials need not be endless. The same object may likewise be attained by using them divisionally or individually in case of the slats being divided into more than two pairs. They can also be arranged inside the steel belts instead of on the slat conveyor.

Figure 1:
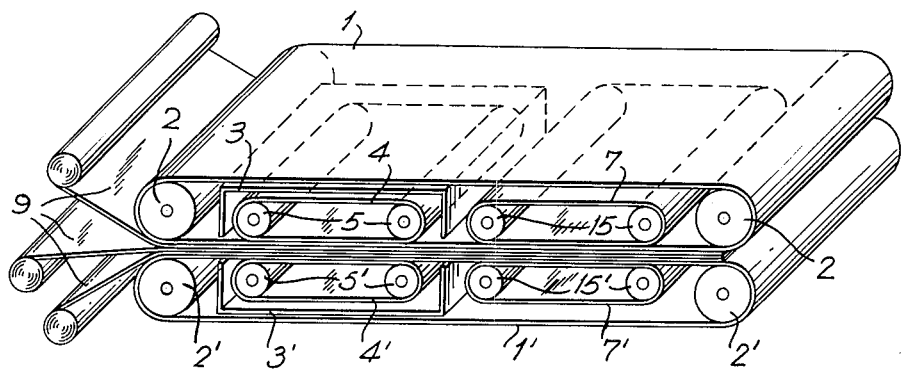
FIG. 1 is a somewhat schematic oblique view illustrating one embodiment of the present invention.

Although separate slat conveyors are arranged in the heating zone as well as in the cooling zone in FIGS. 1 and 2, it is also possible to unify these conveyors into one, in which case, however, heating and cooling efficiency will deteriorate and the manufacturing speed will decrease.

As illustrated in FIG. 1, the resin sheet or board may be situated in a substantial area on the surface of the said conveyor and strips of resin sheet or board to be adhered together or laminated are piled in layers and are put and pressed between the steel belts of the above-mentioned example. By their forward movement, the air that remains between the piled sheets or boards will be pushed out and, as the surface of the dressing steel belt is pressed upon the surface of the top-lying resin board, a beautifully-finished resin sheet or board can be manufactured.

The piled strips need not be thermally elastic synthetic resin sheets or boards. They may likewise be strips of cloth or any other materials.

In order to apply the present invention by interposing an elastic sheet between the back of each steel belt and the surface of the adjacent slat conveyor, either a soft elastic strip may be placed on the exterior surface of each slat of the slat-type conveyors, as illustrated in FIG. 15, or the entire exterior surface of the slat conveyor can be covered with a soft elastic strip, as illustrated in FIGS. 3 through 8, 12 and 14.

As an example of a different arrangement, it may be noted that, along the surface or the side opposite to the contacting surface of the metal belts, or along the whole back side of the belt, an elastic sheet be adhered, as illustrated in FIG. 16.

When the present device is used with the elastic sheet attached to the exterior side only of each slat of the slat conveyor, the distance between the slats may become longer or shorter, but the thickness of the elastic sheet itself will remain unchanged and, therefore, it is a great advantage to make the elastic sheet maintain a uniform thickness.

If the cushioning materials interposed between the steel belt and the slat conveyor are in the form of an endless belt of cushioning material, distortion of the cushioning materials resultant from their being caught between the sandwiched parts of the conveyors and the belts may be alleviated by play. As a result, the press of the slat conveyor can be uniformly be transmitted to the steel belt.

For example, in FIGS. 3, 5, 12 and 13, a fixed frame 17' supports a belt 19' and a slat conveyor 14' connected to the power source (not shown). Pillars 25 are secured to, and extend from, said frame 17', and are inserted through a sliding frame 17 in a freely slidable relation. Said sliding frame 17 supports a belt 19 and the slat conveyor 14 connected to the power source (not shown). An oil-pressure cylinder 26 is secured to a frame 27 which is, in turn, secured to the pillars 25. A piston 28 extends from the sliding frame 17 into the cylinder 26 in a freely slidable relation with said cylinder. The oil-pressure cylinder is provided with means (not shown) for supplying and delivering oil to it. The fixed frame 17' and the sliding frame 17 may be combined in such a manner as to be relatively slidable only in the parallel relation, or in such a manner as to approach each other in a desired relative position.

It may be desirable to feed and press the film between the steel belts which are made to keep a constant distance between them. Or it may be desirable to feed and press the film between the steel belts which are made to keep a standard distance between them in such a manner that, the greater the force tending to separate them, the greater is the force tending to restore them to their original separation.

While we have shown and described above the preferred processing method and devices in which the principle of the present invention is embodied, it is to be understood that our invention is not to be limited to the specific details shown and described above, but that, in fact, widely different means may be used in the practice of the broader aspects of our invention.

What we claim is:

1. Apparatus for continuously processing thermoplastic resin sheets comprising, in combination, a pair of endless steel belts trained around respective pairs of longitudinally spaced idler rollers, said belts having co-directional inner runs extending in closely spaced parallel relation to receive said sheets therebetween at a material entry end of said steel belt; a pair of endless slat-type conveyors trained around respective pairs of rollers spaced longitudinally a distance substantially less than the longitudinal spacing of said idler rollers, each slat-type conveyor being arranged within a respective steel belt and said slat-type conveyors having co-directional inner runs each in driving engagement with the inside surface of the inner run of its associated steel belt; the inner runs of said slat-type conveyors pressing the engaged steel belt portions toward each other; pressing and heating means positioned in operative relation with said steel belts longitudinally between said slat-type conveyors and the material entry end of said steel belts to heat and soften thermoplastic resin sheets passing between said steel belts; pressing and cooling means positioned in operative relation with said steel belts at their portions thereof engaged by said slat-type conveyors to cool and set the thermoplastic resin sheets passing between said steel belts; and compartment means enclosing said pressing and heating means to thermally isolate said pressing and heating means from said pressing and cooling means; each compartment means including first and second walls extending transversely of said steel belts and substantially normal thereto, each with an edge substantially engaging the associated steel belt; the first wall of each compartment means being disposed between the entry end of said pressing and heating means and the adjacent idler roller of the respective steel belt; the second wall of each compartment means being disposed closely adjacent the exit end of said pressing and heating means; each compartment means including a third wall extending longitudinally of the associated steel belt and interconnecting said first and second walls and disposed between the associated pressing and heating means and the outer run of the associated steel belt.

2. Apparatus for continuously processing thermoplastic resin sheets, as claimed in claim 1, in which said pressing and heating includes two sets of rollers, each roller extending transversely of and in engagement with the inside surface of the inner run of a respective steel belt within the portion thereof operatively related with said pressing and heating means; said rollers operating to heat the respective steel belts and to press the belts toward each other in the portion operatively related with said pressing and heating means.

3. Apparatus for continuously processing thermoplastic resin sheets, as claimed in claim 1, in which said pressing and heating means includes a second pair of endless slat-type conveyors, each slat-type conveyor being engaged with the inside surface of the inner run of respective steel belt along the portion thereof operatively related with said pressing and heating means; said second pair of slat-type conveyors pressing said steel belts toward each other along the portions thereof operatively related with said pressing and heating means.

4. Apparatus for continually processing thermoplastic resin sheets, as claimed in claim 1, in which each slat of each slat-type conveyor is formed with a row of teeth on its inner surfaces extending longitudinally of the conveyor direction of movement; a worm mounted between the runs of each slat-type conveyor for rotation about an axis extending longitudinally of the associated slat-type conveyor, said worm engaging said teeth to effect a smooth uninterrupted drive of the associated slat-type conveyor; and means for driving said worm.

5. Apparatus for continuously processing from a plastic resin sheet, as claimed in claim 4, in which the axial extent of said worm is substantially greater than the longitudinal spacing between the teeth on a pair of adjacent slats whereby said worm is always in engagement with the teeth on at least one slat.

References Cited by the Examiner
UNITED STATES PATENTS

| | | | |
|---|---|---|---|
| 93,364 | 8/1869 | Sterne | 198—193 X |
| 1,787,821 | 1/1931 | Halls | 100—154 |
| 2,029,081 | 1/1936 | Mottweiler | 100—154 X |
| 2,075,735 | 3/1937 | Loomis. | |
| 2,975,470 | 3/1961 | Snelson et al. | 100—93 X |
| 3,106,152 | 10/1963 | Coffelt | 100—118 |

WALTER A. SCHEEL, *Primary Examiner.*

EARL M. BERGERT, *Examiner.*